United States Patent
Dai et al.

(10) Patent No.: US 11,520,219 B2
(45) Date of Patent: Dec. 6, 2022

(54) HEAT DISSIPATING MODULE AND PROJECTION DEVICE

(71) Applicant: Coretronic Corporation, Hsin-Chu (TW)

(72) Inventors: Jia-Hong Dai, Hsin-Chu (TW); Jing-Wei Chen, Hsin-Chu (TW); Jhih-Tong Chen, Hsin-Chu (TW); Kai-Lun Hou, Hsin-Chu (TW); Te-Ying Tsai, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 250 days.

(21) Appl. No.: 16/944,133

(22) Filed: Jul. 30, 2020

(65) Prior Publication Data

US 2021/0033952 A1    Feb. 4, 2021

Related U.S. Application Data

(60) Provisional application No. 62/882,602, filed on Aug. 4, 2019.

(30) Foreign Application Priority Data

Nov. 29, 2019   (CN) .......................... 201911198424.2

(51) Int. Cl.
*G03B 21/16* (2006.01)
*F21V 29/61* (2015.01)
*F21V 29/51* (2015.01)

(52) U.S. Cl.
CPC .............. *G03B 21/16* (2013.01); *F21V 29/51* (2015.01); *F21V 29/61* (2015.01)

(58) Field of Classification Search
CPC .......... G03B 21/16; F21V 29/51; F21V 29/61
See application file for complete search history.

(56) References Cited

U.S. PATENT DOCUMENTS 8,002,415 B2 *   8/2011   Nakamura ........... G03B 21/006
                                                          353/54
2006/0244926 A1   11/2006   Shih et al.
(Continued)

FOREIGN PATENT DOCUMENTS

| CN | 100445864 | 12/2008 |
|---|---|---|
| CN | 201673359 | 12/2010 |

(Continued)

OTHER PUBLICATIONS

Office Action of China Counterpart Application, dated Nov. 29, 2021, pp. 1-11.

*Primary Examiner* — Magda Cruz
(74) *Attorney, Agent, or Firm* — JCIPRNET

(57) ABSTRACT

The invention provides a heat dissipating module configured to dissipate heat of at least one heating element of a projection device. The heat dissipating module includes a first radiator, a second radiator, a pipe, and at least one fan. The second radiator is disposed opposite to the first radiator. The heating element, the first radiator, and the second radiator are connected to each other through the pipe to form a loop. A working fluid is configured to be filled in the pipe, and the working fluid flows through the first radiator after flowing through the second radiator for heat exchange, and the working fluid flowing into the first radiator flows to the heating element for cyclic heat dissipation after heat exchange again through the first radiator. The fan is configured between the first radiator and the second radiator.

22 Claims, 6 Drawing Sheets

(56) References Cited

U.S. PATENT DOCUMENTS

| | | | | |
|---|---|---|---|---|
| 2010/0045941 A1* | 2/2010 | Chen | ............... | G03B 21/16 |
| | | | | 353/61 |
| 2011/0157560 A1 | 6/2011 | Hsiao | | |
| 2011/0181842 A1* | 7/2011 | Kanno | ............... | G03B 21/16 |
| | | | | 362/249.02 |
| 2013/0070453 A1* | 3/2013 | Chiba | ............... | G03B 21/16 |
| | | | | 362/231 |
| 2017/0277027 A1* | 9/2017 | Fukuda | ............... | F28D 15/0275 |
| 2020/0201151 A1* | 6/2020 | Wu | ............... | G03B 21/145 |

FOREIGN PATENT DOCUMENTS

| | | |
|---|---|---|
| CN | 103163713 | 5/2015 |
| CN | 106814525 | 6/2017 |
| CN | 209089136 | 7/2019 |
| CN | 210720996 | 6/2020 |

* cited by examiner

HEAT DISSIPATING MODULE AND PROJECTION DEVICE

CROSS-REFERENCE TO RELATED APPLICATION

This application claims the priority benefit of U.S. Provisional application Ser. No. 62/882,602, filed on Aug. 4, 2019 and China application serial no. 201911198424.2, filed on Nov. 29, 2019. The entirety of the above-mentioned patent application is hereby incorporated by reference herein and made a part of this specification.

BACKGROUND

Technical Field

The disclosure relates to a heat dissipating module and projection device, and in particular, to a heat dissipating module with improved heat dissipating effect and a projection device that applies the heat dissipating module.

Description of Related Art

In a solid-state light source projection system, heat generated by a light source is usually dissipated by air cooling. At present, the design of air-cooling heat dissipation has a thermal resistance value of about 0.12° C./W. If heat increases, when the thermal resistance drops below 0.1° C./W, a thermoelectric cooling (TEC) or water-cooling technology must be used to dissipate the heat. The water-cooling heat dissipation is characterized with advantages of low thermal resistance and better heat exchange efficiency than that of the air-cooling heat dissipation. When there are space limitations and low thermal resistance requirements, the water-cooling design is mainly selected to dissipate the heat.

The water-cooling heat dissipating system is composed of three fans, one radiator, a pipe containing water-cooling liquid, a cold plate, a pump, and an accommodating tank. The fans are located between the radiator and a heat source, and the heat source is in direct contact with the cold plate. The water-cooling heat dissipating system is circulated as follows: first, after the water-cooling liquid in the accommodating tank is driven by a pump, the water-cooling liquid first flows through a heat dissipating plate, so that the water-cooling liquid exchanges heat with air to reduce a temperature of the water-cooling liquid. Next, after the temperature is reduced, the water-cooling liquid with a relatively low temperature flows through the heat source. The fan draws the outside air from an air inlet to cool the radiator, and air flow from an air outlet of the fan indirectly cools the cold plate, so that the air flow cannot be applied effectively. In addition, a temperature of the heat source rises. If a same temperature of the heat source is to be controlled and maintained, in addition to increasing the number of the fans and improving the pump performance, it is only possible to increase the volume of the radiator. In this way, the volume of the water-cooling heat dissipating system becomes large, leading to a poor overall space utilization.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a heat dissipating module that may have improved heat dissipation efficiency.

The invention is further directed to a projection device including the foregoing heat dissipating module, so that a heat dissipation area may be increased, and a rotating speed of a fan is reduced without an increase of a number of the fan, further reducing system noise.

Other objectives and advantages of the invention may be further known from technical features disclosed in the invention.

In order to achieve one of or a part of or all of the foregoing objectives or other objectives, an embodiment of the invention proposes a heat dissipating module configured to dissipate heat of at least one heating element of a projection device. The heat dissipating module includes a first radiator, a second radiator, a pipe, and at least one fan. The second radiator is disposed opposite to the first radiator. The heating element, the first radiator, and the second radiator are connected to each other through the pipe to form a loop. A working fluid is configured to be filled in the pipe, and the working fluid flows through the first radiator after flowing through the second radiator for heat exchange, and the working fluid flowing into the first radiator flows to the heating element for cyclic heat dissipation after heat exchange again through the first radiator. The fan is configured between the first radiator and the second radiator.

In order to achieve one of or a part of or all of the foregoing objectives or other objectives, an embodiment of the invention proposes a projection device including a casing, a projection lens, at least one heating element, and a heat dissipating module. The projection lens is joined with the casing. The heating element is configured in the casing. The heat dissipating module is configured in the casing, and the heat dissipating module includes a first radiator, a second radiator, a pipe, and at least one fan. The second radiator is disposed opposite to the first radiator, and the heating element, the first radiator, and the second radiator are connected to each other through the pipe to form a loop. A working fluid is configured to be filled in the pipe, and the working fluid flows through the first radiator after flowing through the second radiator for heat exchange, and the working fluid flowing into the first radiator flows to the heating element for cyclic heat dissipation after heat exchange again through the first radiator. The fan is configured between the first radiator and the second radiator.

Based on the foregoing, embodiments of the invention are characterized with at least one of the following advantages or effects. In the design of the heat dissipating module of the invention, the second radiator is disposed opposite to the first radiator, and the fans are configured between the first radiator and the second radiator, that is, the first radiator, the fans, and the second radiator are configured to form a sandwich structure. The working fluid in the pipe flows through the first radiator after flowing through the second radiator for heat exchange, and the working fluid flowing into the first radiator flows to the heating element for cyclic heat dissipation after heat exchange again through the first radiator. Through the two-stage cooling of the water temperature, the heat dissipating module of the invention may have improved heat dissipation efficiency. In addition, the projection device applies the heat dissipating module of the invention, so that the heat dissipation area may be increased, and the rotating speed of the fans is reduced without the increase of the number of fans, further reducing the system noise.

Other objectives, features and advantages of the invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
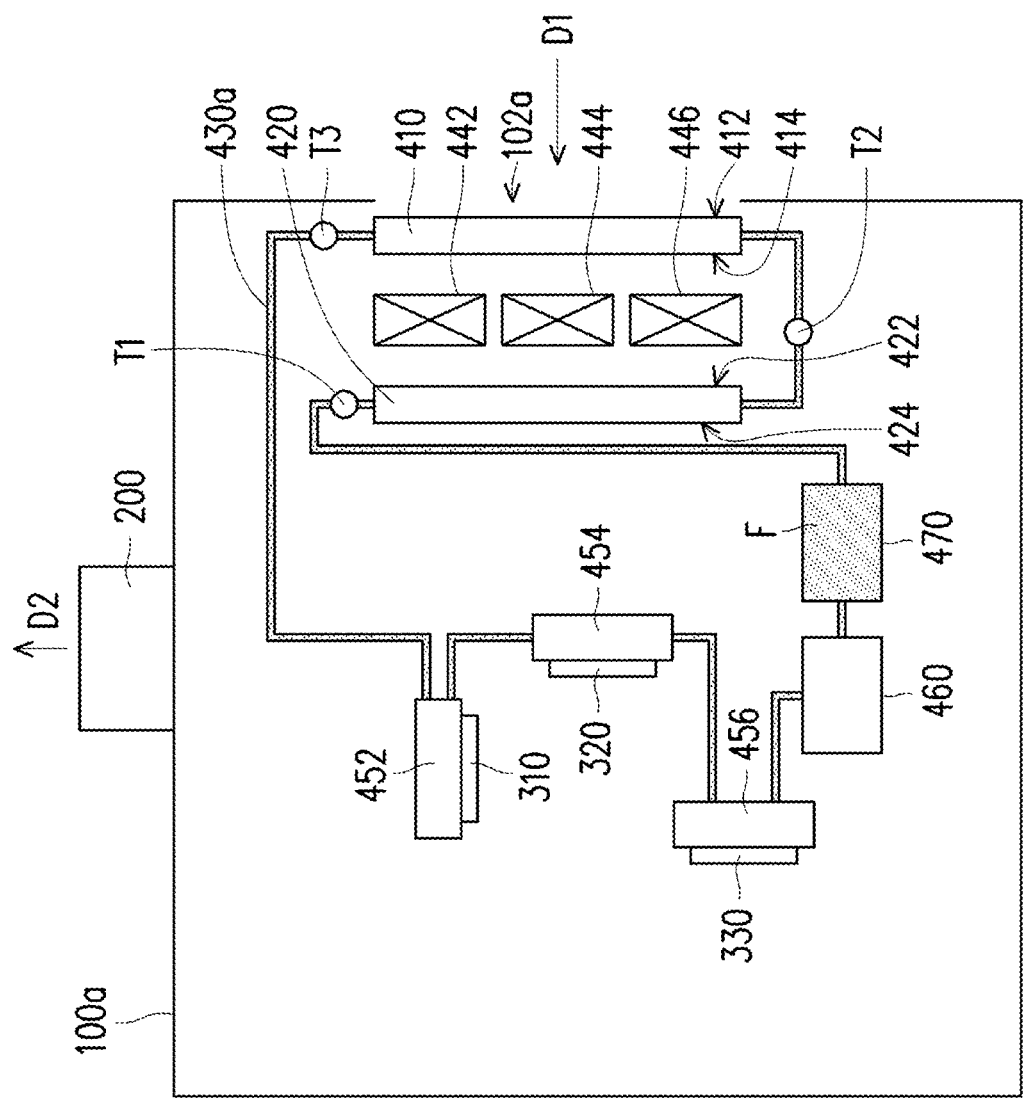
FIG. 1 is a schematic diagram of a projection device according to an embodiment of the invention.

FIG. 1 is a schematic diagram of a projection device according to an embodiment of the invention. Referring to FIG. 1, in the embodiment, a projection device 10a includes a casing 100a, a projection lens 200, at least one heating element (three heating elements 310, 320, and 330 that are schematically drawn), and a heat dissipating module 400a. The projection lens 200 is joined with the casing 100a, and the heating elements 310, 320, 330 and the heat dissipating module 400a are all configured in the casing 100a. The heat dissipating module 400a is configured to dissipate heat of the heating elements 310, 320, 330. In this case, the heating elements 310, 320, and 330 are, for example, a laser light source or a light valve, such as a digital micromirror device (DMD) in an optical engine, but are not limited thereto.

In particular, the heat dissipating module 400a in the embodiment includes a first radiator 410, a second radiator 420, a pipe 430a, and at least one fan (three fans 442, 444, and 446 that are schematically drawn). The second radiator 420 is disposed opposite to the first radiator 410, and the fans 442, 444, and 446 are configured between the first radiator 410 and the second radiator 420. That is to say, as shown in FIG. 1, the first radiator 410, the fans 442, 444, and 446, and the second radiator 420 are configured to form a sandwich structure. The heating elements 310, 320, 330, the first radiator 410, and the second radiator 420 are connected to each other through the pipe 430a to form a loop. A working fluid F is configured to be filled in the pipe 430a and flows in the pipe 430a. After the working fluid F filled in the pipe 430a absorbs heat of at least one heating element 310, 320, 330, the working fluid F first flows through the second radiator 420 for heat exchange, and then continues to flow through the first radiator 410, and the working fluid F flowing into the first radiator 410 flows to the heating elements 310, 320, and 330 for cyclic heat dissipation after heat exchange again through the first radiator 410. That is to say, a temperature of the working fluid F flowing into the second radiator 420 is higher than a temperature of the working fluid F flowing out of the first radiator 410. In this case, the working fluid F is for example water, but is not limited thereto.

In addition, the casing 100a of the embodiment has an air inlet 102a on a right side, that is, the air inlet 102a is located on a right side of the casing 100a relative to the projection lens 200, and the first radiator 410 of the heat dissipating module 400a is disposed corresponding to the air inlet 102a. Air flow generated by the fans 442, 444, and 446 enters the casing 100a from the air inlet 102a and blows from the first radiator 410 toward the second radiator 420. In this case, an air flow direction D1 at the air inlet 102a is perpendicular to a projection direction D2 of the projection lens 200. Further, the first radiator 410 of the embodiment includes a first air inlet side 412 and a first air outlet side 414 that are opposite to each other. The air flow generated by the fans 442, 444, and 446 enters the first radiator 410 from the first air inlet side 412 and exits from the first air outlet side 414, and there is a first pressure difference between the first air inlet side 412 and the first air outlet side 414. The second radiator 420 includes a second air inlet side 422 and a second air outlet side 424 that are opposite to each other. The air flow generated by the fans 442, 444, and 446 enters the second radiator 420 from the second air inlet side 422 and exits from the second air outlet side 424, and there is a second pressure difference between the second air inlet side 422 and the second air outlet side 424. In addition, the second pressure difference is less than the first pressure difference, which means that a pressure drop of the second radiator 420 is lower than a pressure drop of the first radiator 410, thereby reducing impedance of the fans 442, 444, and 446. It is generally known that the greater the flow resistance, the greater the pressure drop, and factors that affect the pressure drop may also include a density, a pitch, or a shape of heat dissipating fins in the radiator.

In order to improve heat dissipating efficiency, the heat dissipating module 400a of the embodiment further includes at least one heat dissipating plate (three heat dissipating plates 452, 454, and 456 that are schematically drawn). The heat dissipating plates contact the heating elements 310, 320, and 330 respectively and are connected to the pipe 430a. In this case, the heat dissipating plates 452, 454, and 456 directly contact the heating elements 310, 320, and 330, respectively, to conduct heat generated by the heating elements 310, 320, and 330, and the working fluid F flows into the heat dissipating plates 452, 454, and 456 to dissipate heat of the heating element 310, 320, 330. The heat dissipating plates 452, 454, and 456 are, for example, cold plates having heat dissipating fins therein, but are not limited thereto.

In addition, the heat dissipating module 400a of the embodiment further includes a first drive element 460 disposed between the second radiator 420 and the heating elements 310, 320, 330 and connected to the pipe 430a. In this case, the first drive element 460 is, for example, a pump, but is not limited thereto. In addition, the heat dissipating module 400a of the present embodiment further includes an accommodating tank 470 disposed between the second radiator 420 and the first drive element 460 and connected to the pipe 430a to accommodate the working fluid F. In this case, the working fluid F within the accommodating tank 470 circulates in the pipe 430a through the first drive element 460.

In particular, the working fluid F has a first temperature T1 between the first drive element 460 and the second radiator 420. The working fluid F has a second temperature T2 between the second radiator 420 and the first radiator 410. The working fluid F has a third temperature T3 between the first radiator 410 and the heating element 310. Preferably, the third temperature T3 is less than the second temperature T2, and the second temperature T2 is less than the first temperature T1. In other words, a place at which the temperature of the working fluid F is highest is in the pipe 430a between the first drive element 460 and the second radiator 420, and a place at which the temperature of the working fluid F is lowest is in the pipe 430a between the first radiator 410 and the heating element 310 (or the heat dissipating plate 452). Therefore, the working fluid F with a lower temperature may dissipate heat of the heating elements 310, 320, and 330.

Air flow generated by the fans 442, 444, and 446 of the embodiment enters the casing 100a from the air inlet 102a of the casing 100a and blows from the first radiator 410 toward the second radiator 420. Therefore, the air flow generated by the fans 442, 444, and 446 first cools the working fluid F located in the first radiator 410 and having the second temperature T2, and performs a heat exchange through the first radiator 410 to obtain the working fluid F with a temperature lower than the second temperature T2 (that is, there is the working fluid F having a third temperature T3 located between the first radiator 410 and the heating element 310). Subsequently, the working fluid F having the lowest temperature (that is, the third temperature T3) flows into the heat dissipating plates 452, 454, and 456 to dissipate heat generated by the heating elements 310, 320, and 330 so as to obtain the working fluid F having the highest temperature (that is, the first temperature T1). The working fluid F having the first temperature T1 enters the second radiator 420, and the working fluid F located in the second radiator 420 and having the first temperature T1 is cooled by the air flow in the first radiator 410. The working fluid F located in the second radiator 420 performs heat exchange again to obtain the working fluid F having the second temperature T2 (that is, the working fluid F located between the second radiator 420 and the first radiator 410). Therefore, in the embodiment, two-stage cooling of the working fluid is used, so that a heat dissipation area of the heat dissipating module 400a is effectively increased without an increase of a number of the fans, thereby reducing a rotating speed of the fans 442, 444, and 446, reducing system noise within the projection device 10a, and effectively applying wind current of the fans 442, 444, and 446.

In short, a water-cooling heat dissipating system is employed in the projection device 10a of the present embodiment. In the design of the heat dissipating module 400a of the present embodiment, the first radiator 410, the fans 442, 444, 446, and the second radiator 420 are configured to form a sandwich structure, and the working fluid F within the pipe 430a flows into the first radiator 410 after flowing through the second radiator 420 for heat exchange, and the working fluid F flowing into the first radiator 410 flows to the heating elements 310, 320, and 330 for cyclic heat dissipation after heat exchange again through the first radiator 410. Through the two-stage cooling of the water temperature, the heat dissipating module 400a of the embodiment may have improved heat dissipation efficiency, and the projection device 10a using the heat dissipating module 400a of the embodiment may increase the heat dissipation area, and may reduce the rotating speed of the fans without the increase of the number of fans, further reducing system noise.

It needs to be noted herein that in the following embodiments, reference numerals and a portion of the foregoing embodiments are used, and same reference numerals are used to represent same or similar elements, and descriptions about same technical contents are omitted. Reference may be made to the foregoing embodiments for the omitted portion, and the descriptions thereof are omitted in the following embodiments.

Figure 2:
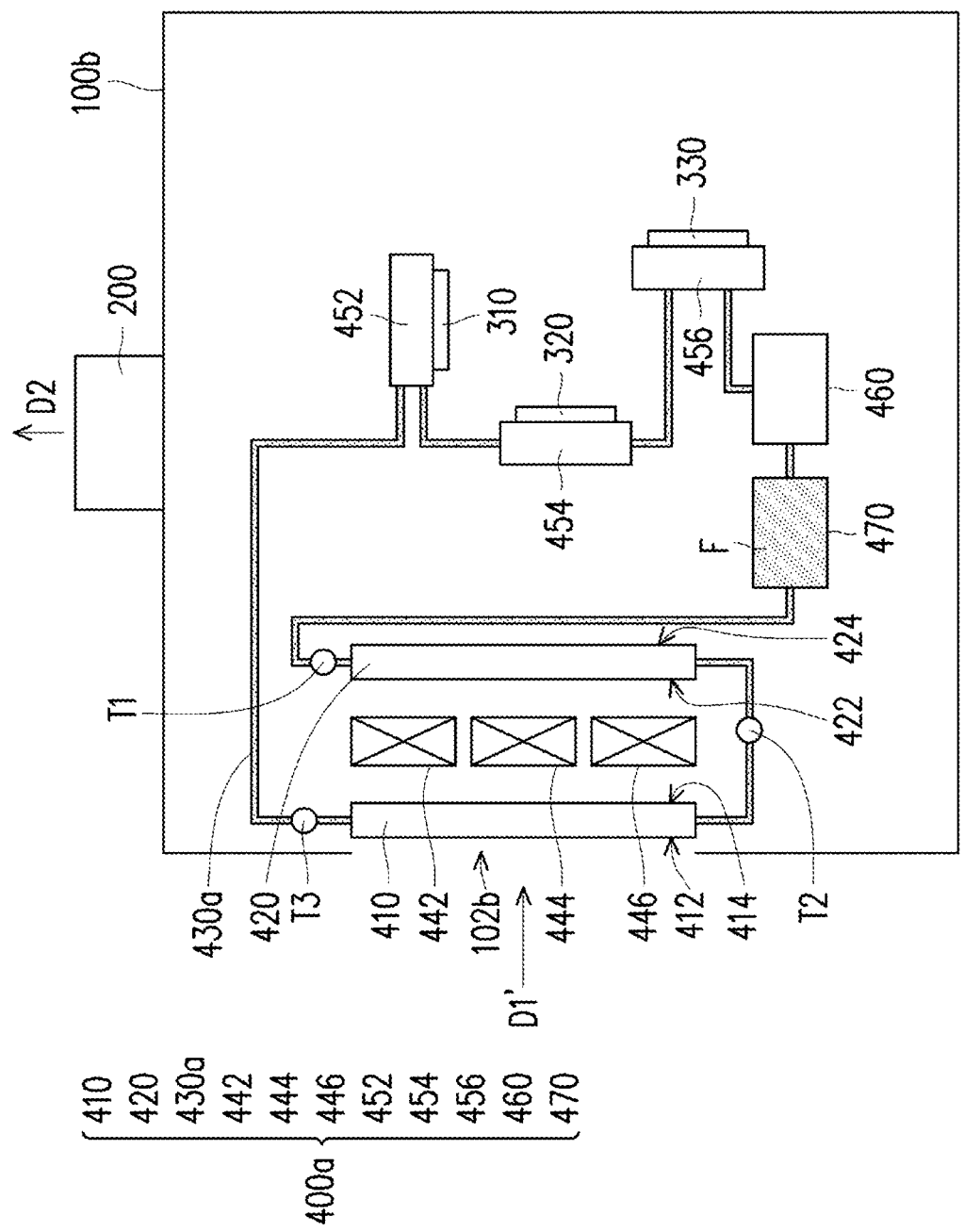
FIG. 2 is a schematic diagram of a projection device according to another embodiment of the invention.

FIG. 2 is a schematic diagram of a projection device according to another embodiment of the invention. Referring to both FIG. 1 and FIG. 2, the projection device 10b of the embodiment is similar to the projection device 10a in FIG. 1. A difference between both is that the casing 100b of the embodiment has an air inlet 102b on a left side, that is, the air inlet 102b is located on a left side of the casing 100b relative to a projection lens 200, and a first radiator 410 of a heat dissipating module 400a is disposed corresponding to the air inlet 102b. Air flow generated by the fans 442, 444, and 446 enters the casing 100b from the air inlet 102b and blows from the first radiator 410 toward a second radiator 420. In this case, an air flow direction D1' at the air inlet 102b is perpendicular to a projection direction D2 of the projection lens 200.

Figure 3:
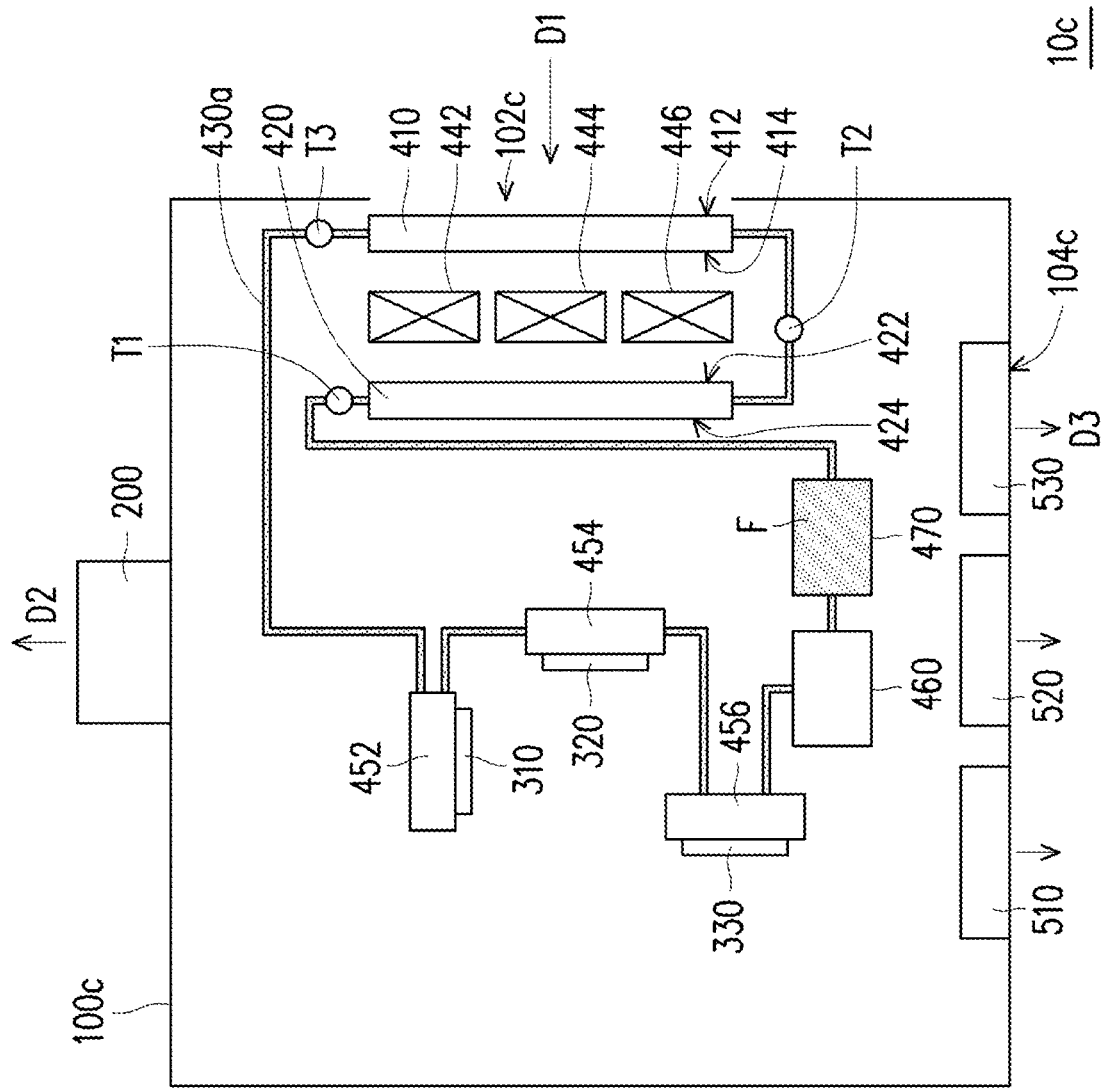
FIG. 3 is a schematic diagram of a projection device according to yet another embodiment of the invention.

FIG. 3 is a schematic diagram of a projection device according to yet another embodiment of the invention. Referring to both FIG. 1 and FIG. 3, a projection device 10c of the embodiment is similar to the projection device 10a in FIG. 1. A difference between both is that a casing 100c of the embodiment has an air outlet 104c at the rear in addition to an air inlet 102c on a right side, that is, the air outlet 104c and a projection lens 200 are located on two opposite sides of the casing 100c, respectively. In this case, an air flow direction D3 at the air outlet 104c is parallel and opposite to a projection direction D2 of the projection lens 200, but it is not limited thereto. In another embodiment that is not drawn, an air flow direction at an air outlet may also be parallel to an air flow direction at an air inlet, which still belongs to the scope to be protected in the invention. In addition, the projection device 10c of the embodiment may further include at least one system fan (three system fans 510, 520, and 530 that are schematically drawn) configured in the casing 100c and disposed corresponding to the air outlet 104c, to take waste heat in the projection device 10c to an outside of the projection device.

Figure 4:
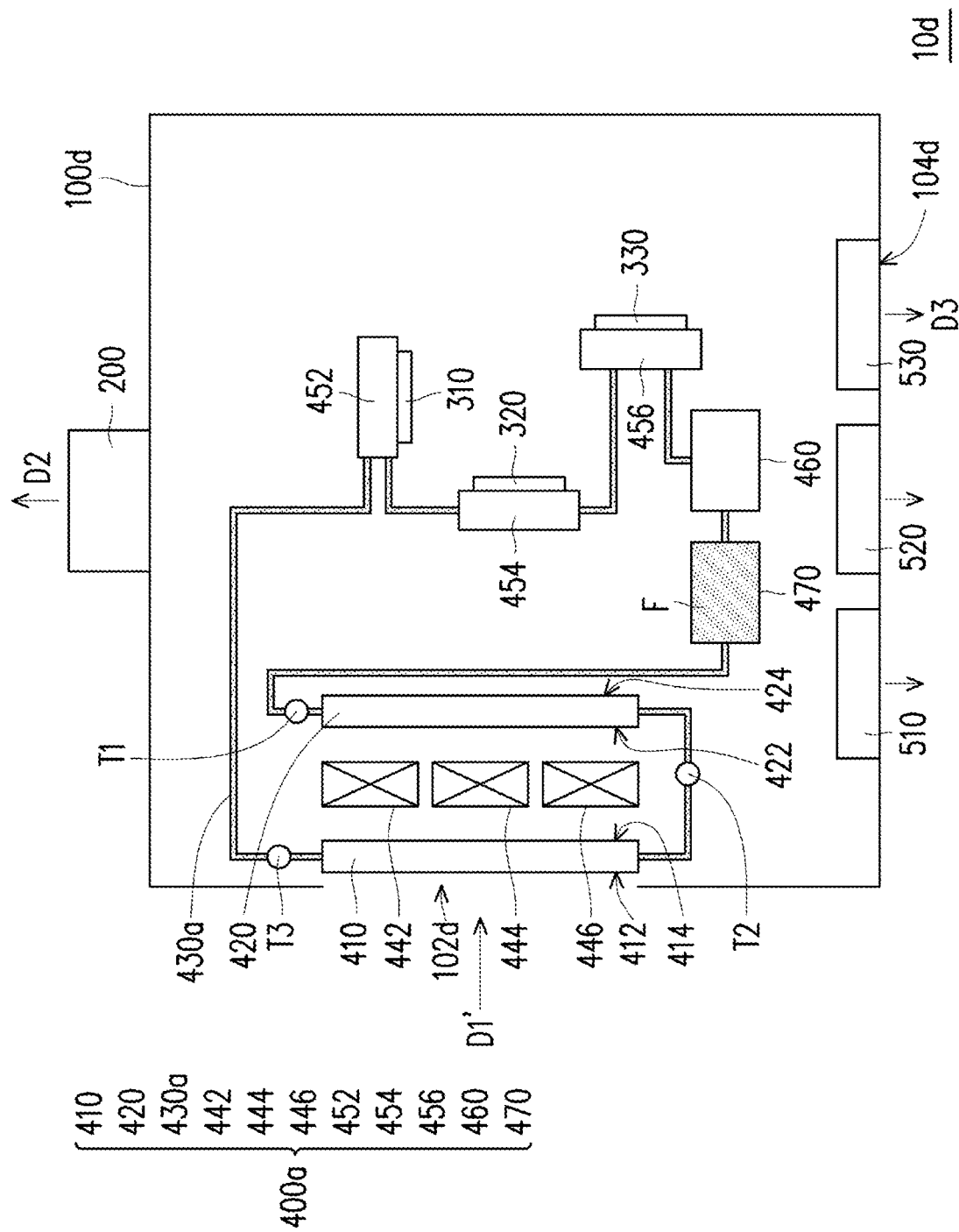
FIG. 4 is a schematic diagram of a projection device according to yet another embodiment of the invention.

FIG. 4 is a schematic diagram of a projection device according to yet another embodiment of the invention. Referring to both FIG. 2 and FIG. 4, a projection device 10d of the embodiment is similar to the projection device 10b in FIG. 2. A difference between both is that a casing 100d of the embodiment has an air outlet 104d at the rear in addition to an air inlet 102d on a left side, that is, the air outlet 104d and a projection lens 200 are located on two opposite sides of the casing 100d, respectively. In this case, an air flow direction D3 at the air outlet 104d is parallel and opposite to a projection direction D2 of the projection lens 200, but it is not limited thereto. In addition, the projection device 10d of the embodiment may further include at least one system fan (three system fans 510, 520, and 530 that are schematically drawn) configured in the casing 100d and disposed corresponding to the air outlet 104d, to take waste heat in the projection device 10d to an outside. In another embodiment that is not drawn, an air flow direction at an air outlet may also be parallel to an air flow direction at an air inlet, which still belongs to the scope to be protected in the invention.

It is worth mentioning that in the design of the air inlets 102c, 102d and the air outlets 104c, 104d in FIG. 3 and FIG. 4, the projection devices 10c, 10d are suitable for horizontally splicing another projection device or more, so that an application range of the projection devices 10c, 10d may be effectively expanded.

Figure 5:
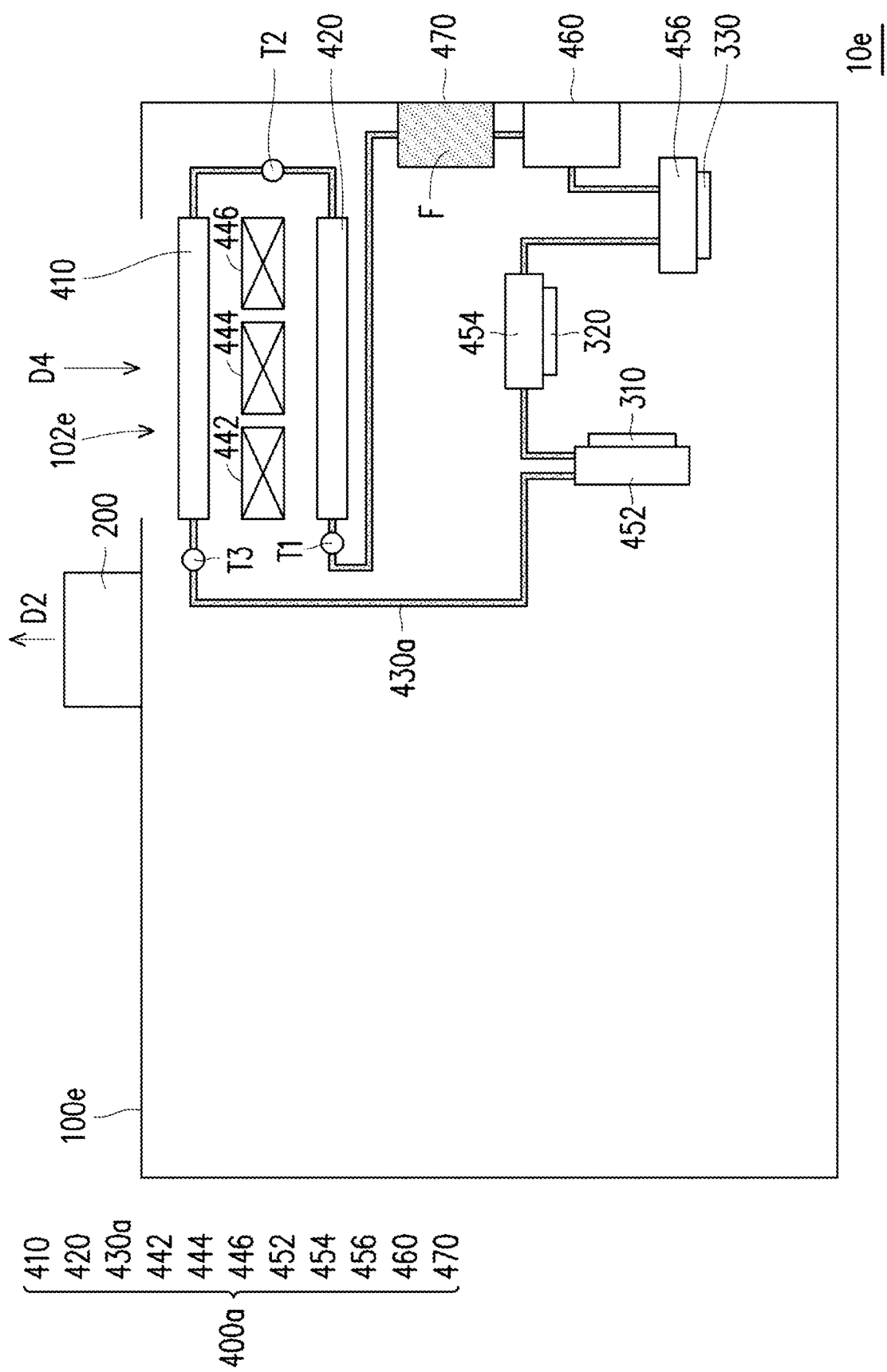
FIG. 5 is a schematic diagram of a projection device according to yet another embodiment of the invention.

FIG. 5 is a schematic diagram of a projection device according to yet another embodiment of the invention. Referring to both FIG. 1 and FIG. 5, a projection device 10e of the embodiment is similar to the projection device 10a in FIG. 1. A difference between both is that a casing 100e of the embodiment has an air inlet 102e in the front, that is, the air inlet 102e and a projection lens 200 are located on a same side of the casing 100e, and an air flow direction D4 at the air inlet 102e is parallel and opposite to a projection direction D2 of the projection lens 200. In another embodiment that is not drawn, an air inlet may be also disposed at the rear of a casing, which still belongs to the scope to be protected in the invention.

Figure 6:
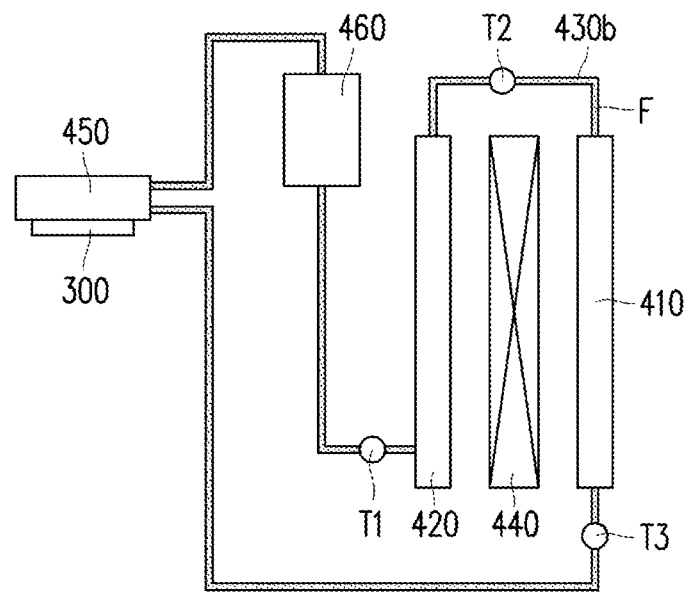
FIG. 6 is a schematic diagram of a heat dissipating module and a heating element according to an embodiment of the invention.

FIG. 6 is a schematic diagram of a heat dissipating module and a heating element according to an embodiment of the invention. Referring to both FIG. 1 and FIG. 6, a heat dissipating module 400b of the embodiment is similar to the heat dissipating module 400a in FIG. 1. A difference between both is that the heat dissipating module 400b of the embodiment only dissipates heat of one heating element 300 that is in direct contact with a heat dissipating plate 450. After the working fluid F absorbs heat generated by the heating element 300, the working fluid first flows through the second radiator 420 for heat exchange, and then continues to flow through the first radiator 410, and the working fluid F flowing into the first radiator 410 flows to the heating element 300 for cyclic heat dissipation after heat exchange again through the first radiator 410. In addition, for the heat dissipating module 400b of the embodiment, only one fan 440 is configured between the first radiator 410 and the second radiator 420. In addition, an accommodating tank is not disposed in the embodiment, and the working fluid F circulates in a pipe 430b driven by a first drive element 460.

Figure 7:
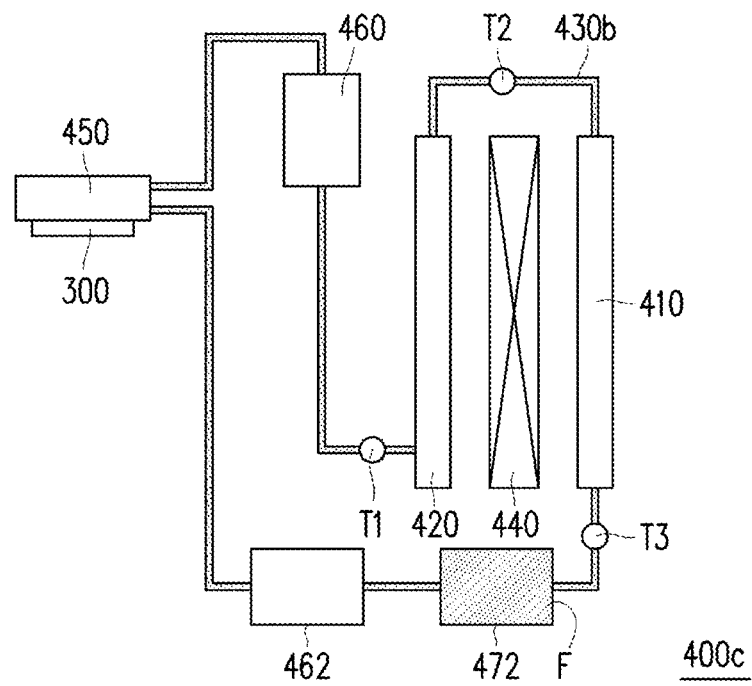
FIG. 7 is a schematic diagram of a heat dissipating module and a heating element according to another embodiment of the invention.

FIG. 7 is a schematic diagram of a heat dissipating module and a heating element according to another embodiment of the invention. Referring to both FIG. 6 and FIG. 7, a heat dissipating module 400c of the embodiment is similar to the heat dissipating module 400b in FIG. 6. A difference between both is that the heat dissipating module 400c of the embodiment further includes a second drive element 462 and an accommodating tank 472. The second drive element 462 and the accommodating tank 472 are disposed between the first radiator 410 and the heating element 300 (or heat dissipating plate 450) and connected to a pipe 430b. The accommodating tank 472 accommodates a working fluid F, and the working fluid F circulates in the pipe 430b through the second drive element 462. After the working fluid F absorbs heat generated by the heating element 300, the working fluid first flows through the second radiator 420 for heat exchange, and then continues to flow through the first radiator 410, and the working fluid F flowing into the first radiator 410 flows to the heating element 300 for cyclic heat dissipation after heat exchange again through the first radiator 410.

Based on the foregoing, embodiments of the invention are characterized with at least one of the following advantages or effects. In the design of the heat dissipating module of the invention, the second radiator is disposed opposite to the first radiator, and the fans are configured between the first radiator and the second radiator, that is, the first radiator, the fans, and the second radiator are configured to form a sandwich structure (an interlayer structure). The working fluid in the pipe flows into the first radiator after flowing through the second radiator for heat exchange, and the working fluid flowing into the first radiator flows to the heating element for cyclic heat dissipation after heat exchange again through the first radiator. Through the two-stage cooling of the water temperature, the heat dissipating module of the invention may have improved heat dissipation efficiency. In addition, the projection device applies the heat dissipating module of the invention, so that the heat dissipation area may be increased, and the rotating speed of the fans is reduced without the increase of the number of fans, further reducing the system noise.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A heat dissipating module configured to dissipate heat of at least one heating element of a projection device, wherein the heat dissipating module comprises a first radiator, a second radiator, a pipe, and at least one fan, wherein
the second radiator is disposed opposite to the first radiator, and the at least one heating element, the first radiator, and the second radiator are connected to each other through the pipe to form a loop, wherein a working fluid is configured to be filled in the pipe, the working fluid flows through the first radiator after flowing through the second radiator for heat exchange, and the working fluid flowing into the first radiator flows to the at least one heating element for cyclic heat dissipation after heat exchange again through the first radiator;
the at least one fan is configured between the first radiator and the second radiator; and
the first radiator comprises a first air inlet side and a first air outlet side opposite to each other, air flow generated by the at least one fan enters the first radiator from the first air inlet side and exits from the first air outlet side, and a first pressure difference exists between the first air inlet side and the first air outlet side, wherein the second radiator comprises a second air inlet side and a second air outlet side opposite to each other, the air flow generated by the at least one fan enters the second radiator from the second air inlet side and exits from the second air outlet side, a second pressure difference exists between the second air inlet side and the second air outlet side, and the second pressure difference is less than the first pressure difference.

2. The heat dissipating module according to claim 1, wherein air flow of the at least one fan blows from the first radiator toward the second radiator.

3. The heat dissipating module according to claim 1, further comprising:
a first drive element disposed between the second radiator and the at least one heating element and connected to the pipe.

4. The heat dissipating module according to claim 3, further comprising:
an accommodating tank disposed between the second radiator and the first drive element and connected to the pipe to accommodate the working fluid, wherein the working fluid within the accommodating tank circulates in the pipe through the first drive element.

5. The heat dissipating module according to claim 3, wherein the working fluid comprises a first temperature between the first drive element and the second radiator, the working fluid comprises a second temperature between the second radiator and the first radiator, and the working fluid comprises a third temperature between the first radiator and the at least one heating element, wherein the third temperature is less than the second temperature, and the second temperature is less than the first temperature.

6. The heat dissipating module according to claim 3, further comprising:
a second drive element and an accommodating tank which are disposed between the first radiator and the at least one heating element and connected to the pipe, wherein the accommodating tank accommodates the working fluid, and the working fluid circulates in the pipe through the second drive element.

7. The heat dissipating module according to claim 1, further comprising:
at least one heat dissipating plate in contact with the at least one heating element and connected to the pipe, wherein the working fluid flows into the at least one heat dissipating plate to dissipate heat of the at least one heating element.

8. A projection device, comprising a casing, a projection lens, at least one heating element, and a heat dissipating module, wherein
the projection lens is joined with the casing;
the at least one heating element is configured in the casing; and
the heat dissipating module is configured in the casing, and the heat dissipating module comprises a first radiator, a second radiator, a pipe, and at least one fan, wherein
the second radiator is disposed opposite to the first radiator, and the at least one heating element, the first radiator, and the second radiator are connected to each other through the pipe to form a loop, wherein a working fluid is configured to be filled in the pipe, the working fluid flows through the first radiator after flowing through the second radiator for heat exchange, and the working fluid flowing into the first radiator flows to the at least one heating element for cyclic heat dissipation after heat exchange again through the first radiator;
the at least one fan is configured between the first radiator and the second radiator; and
the first radiator comprises a first air inlet side and a first air outlet side opposite to each other, air flow generated by the at least one fan enters the first radiator from the first air inlet side and exits from the first air outlet side, and a first pressure difference exists between the first air inlet side and the first air outlet side, wherein the second radiator comprises a second air inlet side and a second air outlet side opposite to each other, the air flow generated by the at least one fan enters the second radiator from the second air inlet side and exits from the second air outlet side, a second pressure difference exists between the second air inlet side and the second air outlet side, and the second pressure difference is less than the first pressure difference.

9. The projection device according to claim 8, wherein the casing comprises an air inlet, the first radiator of the heat dissipating module is disposed corresponding to the air inlet, and air flow generated by the at least one fan enters into the casing from the air inlet and blows from the first radiator toward the second radiator.

10. The projection device according to claim 9, wherein an air flow direction at the air inlet is perpendicular to a projection direction of the projection lens.

11. The projection device according to claim 10, wherein the casing further comprises an air outlet, and an air flow direction at the air outlet is parallel to the air flow direction at the air inlet or parallel to the projection direction of the projection lens.

12. The projection device according to claim 11, further comprising:
at least one system fan configured in the casing and disposed corresponding to the air outlet.

13. The projection device according to claim 9, wherein an air flow direction at the air inlet is parallel to a projection direction of the projection lens.

14. The projection device according to claim 8, wherein the heat dissipating module further comprises:
at least one heat dissipating plate in contact with the at least one heating element and connected to the pipe, wherein the working fluid flows into the at least one heat dissipating plate to dissipate heat of the at least one heating element.

15. The projection device according to claim 8, wherein the heat dissipating module further comprises:
a first drive element disposed between the second radiator and the at least one heating element and connected to the pipe.

16. The projection device according to claim 15, wherein the heat dissipating module further comprises:
an accommodating tank disposed between the second radiator and the first drive element and connected to the pipe to accommodate the working fluid, wherein the working fluid within the accommodating tank circulates in the pipe through the first drive element.

17. The projection device according to claim 15, wherein the working fluid comprises a first temperature between the first drive element and the second radiator, the working fluid comprises a second temperature between the second radiator and the first radiator, and the working fluid comprises a third temperature between the first radiator and the at least one heating element, wherein the third temperature is less than the second temperature, and the second temperature is less than the first temperature.

18. The projection device according to claim 15, wherein the heat dissipating module further comprises:
a second drive element and an accommodating tank which are disposed between the first radiator and the at least one heating element and connected to the pipe, wherein the accommodating tank accommodates the working fluid, and the working fluid circulates in the pipe through the second drive element.

19. A heat dissipating module configured to dissipate heat of at least one heating element of a projection device, wherein the heat dissipating module comprises a first radiator, a second radiator, a pipe, at least one fan, and a first drive element, wherein
the second radiator is disposed opposite to the first radiator, and the at least one heating element, the first radiator, and the second radiator are connected to each other through the pipe to form a loop, wherein a working fluid is configured to be filled in the pipe, the working fluid flows through the first radiator after flowing through the second radiator for heat exchange, and the working fluid flowing into the first radiator flows to the at least one heating element for cyclic heat dissipation after heat exchange again through the first radiator;
the at least one fan is configured between the first radiator and the second radiator;
the first drive element is disposed between the second radiator and the at least one heating element and is connected to the pipe; and
the working fluid comprises a first temperature between the first drive element and the second radiator, the working fluid comprises a second temperature between the second radiator and the first radiator, and the working fluid comprises a third temperature between the first radiator and the at least one heating element, wherein the third temperature is less than the second temperature, and the second temperature is less than the first temperature.

20. A heat dissipating module configured to dissipate heat of at least one heating element of a projection device, wherein the heat dissipating module comprises a first radiator, a second radiator, a pipe, at least one fan, a first drive element, a second drive element and an accommodating tank, wherein
the second radiator is disposed opposite to the first radiator, and the at least one heating element, the first radiator, and the second radiator are connected to each other through the pipe to form a loop, wherein a working fluid is configured to be filled in the pipe, the working fluid flows through the first radiator after flowing through the second radiator for heat exchange, and the working fluid flowing into the first radiator flows to the at least one heating element for cyclic heat dissipation after heat exchange again through the first radiator;
the at least one fan is configured between the first radiator and the second radiator;
the first drive element is disposed between the second radiator and the at least one heating element and is connected to the pipe; and
the second drive element and the accommodating tank are disposed between the first radiator and the at least one heating element and are connected to the pipe, wherein the accommodating tank accommodates the working fluid, and the working fluid circulates in the pipe through the second drive element.

21. A projection device, comprising a casing, a projection lens, at least one heating element, and a heat dissipating module, wherein
the projection lens is joined with the casing;
the at least one heating element is configured in the casing; and
the heat dissipating module is configured in the casing, and the heat dissipating module comprises a first radiator, a second radiator, a pipe, at least one fan, and a first drive element, wherein
the second radiator is disposed opposite to the first radiator, and the at least one heating element, the first radiator, and the second radiator are connected to each other through the pipe to form a loop, wherein a working fluid is configured to be filled in the pipe, the working fluid flows through the first radiator after flowing through the second radiator for heat exchange, and the working fluid flowing into the first radiator flows to the at least one heating element for cyclic heat dissipation after heat exchange again through the first radiator; and the at least one fan is configured between the first radiator and the second radiator;

the first drive element is disposed between the second radiator and the at least one heating element and is connected to the pipe; and the working fluid comprises a first temperature between the first drive element and the second radiator, the working fluid comprises a second temperature between the second radiator and the first radiator, and the working fluid comprises a third temperature between the first radiator and the at least one heating element, wherein the third temperature is less than the second temperature, and the second temperature is less than the first temperature.

22. A projection device, comprising a casing, a projection lens, at least one heating element, and a heat dissipating module, wherein the projection lens is joined with the casing;

the at least one heating element is configured in the casing; and the heat dissipating module is configured in the casing, and the heat dissipating module comprises a first radiator, a second radiator, a pipe, and at least one fan, a first drive element, a second drive element and an accommodating tank, wherein the second radiator is disposed opposite to the first radiator, and the at least one heating element, the first radiator, and the second radiator are connected to each other through the pipe to form a loop, wherein a working fluid is configured to be filled in the pipe, the working fluid flows through the first radiator after flowing through the second radiator for heat exchange, and the working fluid flowing into the first radiator flows to the at least one heating element for cyclic heat dissipation after heat exchange again through the first radiator;

the at least one fan is configured between the first radiator and the second radiator;

the first drive element is disposed between the second radiator and the at least one heating element and is connected to the pipe; and the second drive element and the accommodating tank are disposed between the first radiator and the at least one heating element and are connected to the pipe, wherein the accommodating tank accommodates the working fluid, and the working fluid circulates in the pipe through the second drive element.

* * * * *